Patented Nov. 7, 1944

2,361,936

UNITED STATES PATENT OFFICE 2,361,936

PHOTOGRAPHIC MATERIALS AND PROCESS OF MANUFACTURING SAME

Béla Gáspár, Hollywood, Calif., assignor to Chromogen, Incorporated, a corporation of Nevada No Drawing. Application July 19, 1940, Serial No. 346,436. In Great Britain July 20, 1939

8 Claims. (Cl. 95—7)

In the manufactue of photographic materials, and especially in the manufacture of light-sensitive materials containing silver halides, the binding agent generally used is gelatin. In view of the well-known disadvantages attached to the use of gelatin as a binding agent, the use of other binding agents has been described. Such binding agents are, for instance, cellulose acetate, hydrolyzed to such a degree that it becomes water-soluble or at least capable of swelling in water; cellulose ethers, such as methyl cellulose, which are soluble in water or at least capable of swelling in water; and synthetic condensation products, with the said properties.

This property of being soluble in water or at least capable of swelling in water has hitherto been considered essential in the choice of the binding agent, in view of the subsequent processing of the material.

It has now been found that substances that are insoluble in water and incapable of swelling in water, but soluble in organic solvents, are very suitable binding agents in the production of photographic materials, in particular in the production of light-sensitive materials containing silver halides. Suitable film forming substances are, for instance, synthetic resins, such as those derived from acrylic acid, acrylic acid esters, vinyl esters, aromatic dicarboxyl acids; and cellulose derivatives, more particularly cellulose ethers and cellulose esters such as cellulose triacetate and its higher homologues, benzyl cellulose, and aliphatic cellulose ethers, etherified to such an extent that they become insoluble in water and incapable of swelling in water.

Photographic materials, particularly those containing silver halides, prepared from such substances, show distinct advantages over the materials manufactured with the known binding agents. These advantages will be obvious from the further description of the present invention.

In practising the present invention, the water-insoluble synthetic resins or cellulose derivatives mentioned above are dissolved in organic solvents in the absence of water. Instances of the organic solvents that may be used are as follows for cellulose triacetate; chloroform, tetrachlorethane, pyridine, mixtures of lower aliphatic alcohols with ethylene chloride or methylene chloride or trichlorethylene or ethylidene chloride, or mixtures of these solvents with dioxane or alkyl acetates; and for benzyl cellulose, besides some of the solvents mentioned above for cellulose triacetate, there may also be used benzol, or its mixtures with lower aliphatic alcohols. Silver halides are prepared within these solutions by adding a silver compound, which is soluble in the solvent, or in one of the solvents used in the preparation of the cellulose derivative solution, or in a solvent miscible with any of these solvents. Thereafter, there are added halogen compounds soluble in organic solvents and capable of reacting with the silver compound added to form silver halide. Advantageously there are used silver compounds and halogen compounds, the reaction by-products of which do not adversely affect the photographic material.

To increase the susceptibility to aqueous solutions of photographic materials prepared from these solutions or emulsions, during subsequent processing, there are added either plasticizing agents compatible with the binding agent employed and known to facilitate the penetration of water; or cellulose derivatives soluble in organic solvents and which are at the same time at least capable of swelling in water, such as cellulose glycolic acid; or other compounds compatible with the binding agent and capable of facilitating the penetration of water, such as gelatin or natural or synthetic resins.

Silver compounds referred to above as being soluble in organic solvents are, for instance, the addition products obtainable from silver oxide, or from silver hydroxide, or from silver salts with organic bases, such as ethylene diamine, piperazine, pyridine, etc. (described, for example, in "Berichte der Deutschen Chemischen Gesellschaft, 1894, vol. IV, page 811, in "Chemisches Zentralblatt," 1901, part I, page 1303, and in United States Letters Patent No. 2,030,860 granted February 18, 1936, to George E. Fallesen and Cyril J. Staud).

Halogen compounds referred to above as being soluble in organic solvents and capable of reacting with the above-mentioned silver compounds are, for instance, halogen fatty acid esters, such as the ethyl ester of α-brom acetic acid; or the free halogen fatty acids such as brom acetic acid; or such aromatic halogen compounds that contain a reactive halogen atom, such as dinitrobrom benzol.

Instead of forming the silver halide within the binding agent solutions, the silver halide may also be incorporated into these solutions as such in the form of double compounds soluble in organic solvents, such as the double compounds obtainable from halogen silver and phosphorous acid ethyl ester, as described by Arbusow and Kartaschow in "Chemisches Zentralblatt," 1913, part I, page 1394.

The solutions or emulsions thus produced are employed to prepare light-sensitive layers. For this purpose, the solutions or emulsions may be coated on an ordinary film support, or the photographic material may be formed directly from the solutions or emulsion without the use of a support. If a support is used, it may advantageously be a non-inflammable film. A special advantage of the new binding agents is that the layers prepared therefrom will adhere to such support without the necessity of employing special intermediate adhesion layers.

The photographic layers prepared from the new binding agents according to the invention are especially useful in multi-layer materials for colour photographic purposes. It is well known that the incorporatoin of dyes or dye-forming substances into colour-photographic materials requires special processes, because the dyes and dye-forming substances must be incorporated into aqueous solutions but must thereafter be fast to diffusion and bleeding. As is well known, most of the water-insoluble dye-forming substances and azo dyes used in colour-photographic materials are soluble in organic solvents. These dye-forming substances and dyes therefore can be introduced by dissolving them in the solutions or emulsions according to the present invention, used for making the photographic materials. Because of their water-insolubility, they will show no tendency to diffuse or bleed out during the processing of the material.

In the same manner, cellulose derivatives which are dyes or dye-forming substances can be used for dyeing the solutions and emulsions according to the present invention. Such cellulose derivatives are described for instance in British Patent Specifications Nos. 346,385, 347,117, 347,263, 398,279 and United States Letters Patent No. 2,136,377 granted November 15, 1938, to Ralph Dinklage. These cellulose derivatives are all soluble in organic solvents and can therefore easily be incorporated into the solutions and emulsions.

If the cellulose derivatives used in the process of dyeing are rendered capable of swelling in water by the introduction of carboxylic acid or sulphonic acid groups into their molecule, they may at the same time be used to facilitate the penetration of aqueous solutions into the photographic material. Such cellulose derivatives are described in co-pending United States Patent application No. 322,841 filed March 7, 1940.

I claim:

1. A photographic material including a light-sensitive layer comprising a light-sensitive silver salt dispersed in a binding agent, said binding agent being formed of water-insoluble film-forming substance which is soluble in organic solvents and non-swelling in water, said binding agent further comprising a cellulose derivative which is soluble in organic solvents and capable of swelling in water.

2. A photographic material including a light-sensitive layer comprising a light-sensitive silver salt dispersed in a binding agent, said binding agent being formed of water-insoluble film-forming substance which is soluble in organic solvents and non-swelling in water, said binding agent further comprising a cellulose derivative which has an acid salt-forming group in its molecule and which is soluble in organic solvents and capable of swelling in water.

3. A photographic material including a light-sensitive layer comprising a light-sensitive silver salt dispersed in a binding agent, said binding agent being formed of water-insoluble film-forming substance which is soluble in organic solvents and non-swelling in water, said binding agent further comprising a cellulose derivative which has an acid salt-forming group in its molecule and which is soluble in organic solvents and capable of swelling in water and which possess color-forming properties.

4. A photographic material including a light-sensitive layer comprising a light-sensitive silver salt dispersed in a binding agent, said binding agent being formed of water-insoluble film-forming substance which is soluble in organic solvents and non-swelling in water, said binding agent further comprising a colored cellulose derivative which is soluble in organic solvents and capable of swelling in water.

5. A photographic layer comprising a light sensitive silver salt and a binding agent for said silver salt formed of a water insoluble film forming substance selected from the group consisting of cellulose ethers and cellulose esters with organic acids, which is soluble in an organic solvent and incapable of swelling in the presence of water, said binding agent further comprising a cellulose derivative which is soluble in said organic solvent and capable of swelling in water.

6. A photographic layer comprising a light sensitive silver salt and a binding agent for said silver salt formed of a water insoluble film forming substance selected from the group consisting of cellulose ethers and cellulose esters with organic acids, which is soluble in an organic solvent and incapable of swelling in the presence of water, said binding agent further comprising cellulose glycolic acid which is soluble in said organic solvent and capable of swelling in water.

7. A process for producing a light sensitive photographic material comprising the steps of forming a light sensitive substance by dissolving a water insoluble film forming substance which is non-swelling in water in an organic solvent therefor, adding thereto a cellulose derivative which is soluble in said solvent and compatible with said film forming substance and capable of swelling in water, and adding thereto a silver salt of an organic base soluble in said solvent and a halogen compound soluble in said solvent and capable of reacting with said silver salt to form silver halide.

8. A process for producing a light sensitive photographic material comprising the steps of forming a light sensitive substance by dissolving a water insoluble film forming substance which is non-swelling in water in an organic solvent therefor, adding thereto a cellulose derivative which is soluble in said solvent and compatible with said film forming substance and capable of swelling in water, and incorporating therein a light sensitive double compound of silver halide soluble in said solvent.

BÉLA GÁSPÁR.